Dec. 25, 1962   G. P. RICHARDS   3,070,288
LUBRICATING VALVE
Filed Jan. 25, 1960

INVENTOR:
GRAHAME P. RICHARDS
By Gravely, Lieder & Woodruff
ATTORNEYS.

United States Patent Office 3,070,288
Patented Dec. 25, 1962

3,070,288
LUBRICATING VALVE
Grahame P. Richards, St. Louis County, Mo., assignor to Wagner Electric Corporation, St. Louis, Mo., a corporation of Delaware
Filed Jan. 25, 1960, Ser. No. 4,363
11 Claims. (Cl. 230—206)

This invention relates generally to lubricating valves and more particularly to lubricating valves for compressors and the like.

Many lubricating devices are known in the art includig some which are used in conjunction with compressors and the like. The known devices, however, do not provide periods of free flow communication of lubricant between the compressor and a lubricant source to maintain a desired lubricant level in the compressor. Instead the known devices for the most part employ metering means which transfer predetermined amounts of lubricant back and forth between the lubricant source and the compressor reservoir to maintain the desired lubricant level, and when a condition of considerably under or over lubrication exists such as occurs during sudden changes of pressure as when the compressor is starting, stopping, or going into or out of idling, the known metering devices are apt to be too slow operating and therefore unable to maintain the desired lubricant level. Furthermore, the known devices are not able to provide a free flowing interchange of lubricant in both directions, and therefore are not able to compensate as readily or quickly for over and under lubrication conditions. These and other disadvantages of the known devices are overcome by the present device which comprises a lubricating valve for the reservoir of a compressor or like device which functions in response to pressure fluctuations in the compressor to provide flow communication and therefore a free interchange of lubricant between the compressor and a lubricant source to replenish or diminish the lubricant in the compressor and thereby maintain a desired lubricant level in the compressor reservoir.

It is therefore a principal object of the present invention to provide lubricating valve means for a compressor which maintain a desired lubricant level in a compressor reservoir.

Another object is to provide valve means for replenishing or draining off lubricant in a compressor reservoir by establishing periods of free flow communication between a lubricant source and the compressor reservoir.

Another object is to control the flow of lubricant between a lubricant source and a compressor reservoir in response to changes taking place in the compressor.

Another object is to provide a circulating lubricant source for supplying lubricant to a compressor.

Another object is to provide relatively inexpensive means for lubricating a compressor.

Still another object is to provide lubricating means for a compressor that are relatively easy to install and which can be installed as original equipment or as an improvement to existing equipment.

These and other objects and advantages of the present invention will become apparent after consideration of the following detailed specification of a particular embodiment in conjunction with the accompanying drawing, wherein.

Figure 1:
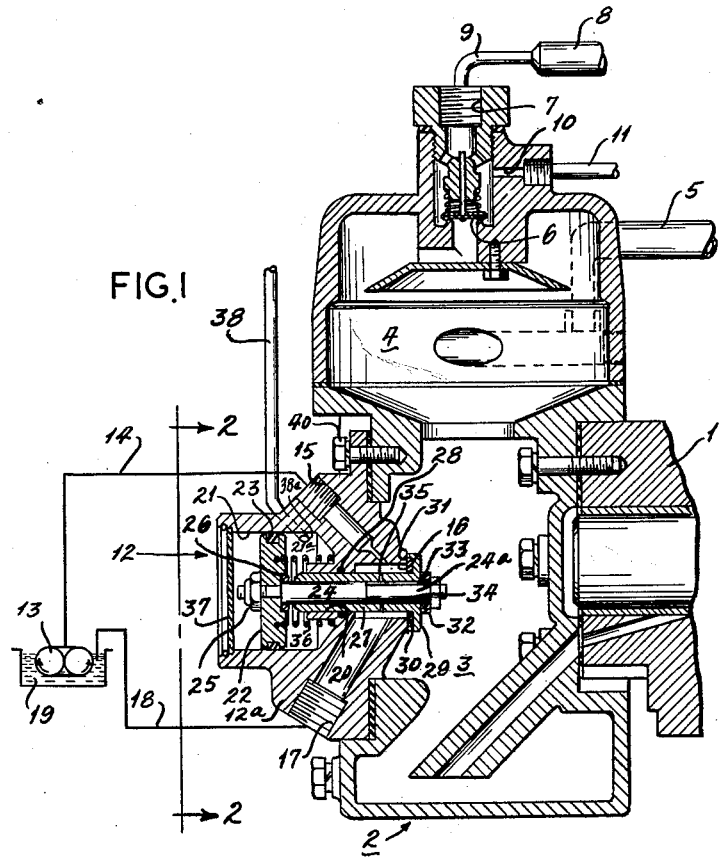
FIG. 1 is a fragmentary cross-sectional elevational view through the center of a lubricating device and compressor constructed according to the present invention.

Referring to the drawing by reference numbers, the number 1 refers generally to the pumping portion of a compressor 2. The compressor 2 is provided with an oil reservoir or sump 3 which supplies oil to the pumping portion 1 thereof and from which a compressed mixture of air and oil is discharged. The compressed mixture is discharged from the compressor outlet (not shown) into a separating chamber 4 through conduit 5. In the separating chamber, the compressed mixture moves along a tortuous path and the oil carried by the mixture accumulates on the path defining members and drains to the reservoir 3 for recirculation through the compressor. The oil free air then flows upwardly through an outlet check valve 6, an outlet port 7, and into a storage tank 8 by way of conduit 9. Another outlet passage 10 communicates the outlet side of the check valve 6 with a conduit 11. The opposite end of the conduit 11 is connected to a compressor control valve (not shown) and is provided to control the cycling of the compressor 2. The cycling controls for the compressor 2 form no part of this invention.

A lubricant supply or lubricating valve assembly 12 having a housing 12a is mounted on the compressor 2 adjacent to the lubricant reservoir 3. The construction and operation of the valve assembly 12 are important to the present invention and the valve assembly 12 is shown in its normal condition which is its condition during compression operations which are referred to as the "On" or charging cycles. During the "On" cycles the compressor operates to supply compressed air to the storage tank 8 through the check valve 6.

An oil pump 13 is provided in conjunction with the lubricating valve 12 and operates continuously to circulate oil through a path defined by a conduit 14, an inlet port 15, a counterbore 16, a return port 17, and finally via a return conduit 18 back to an oil reservoir 19 which feeds the pump 13. The described path is always open and available for circulation of the lubricant.

One end of the counterbore or sump port 16 in the assembly 12 is adjacent to the compressor rservoir 3 and the opposite end thereof communicates with one end of a smaller bore 20 in the housing 12a. The other end of the bore 20 in turn communicates with a relatively larger counterbore 21 that extends out through the housing 12a. A piston 22 which carries an annular seal 23, is slidably positioned in the counterbore 21 and is fastened to a rod assembly 24 by nut 25. An annular seal 26 is mounted on the rod assembly 24 adjacent to the piston 22, and the rod 24 slidably carries a valve stem member 27, one end of which is adapted to cooperate with the seal 26 as will be shown hereinafter. The valve stem member 27 is also slidably positioned in the bore 20 and is sealed thereto by an annular sealing ring 28.

The valve stem member 27 extends to the right through the bore 20 and counterbore 16 and has a valve head portion 29 which is positioned in the compressor reservoir 3. The valve head portion 29 carries an annular valve seal 30 that cooperates with the housing 12a at 31 to close the right end of the counterbore 16.

The rod assembly 24 extends through the valve stem 27 and has a bleeder valve portion 32 thereon which has its own annular sealing ring 33 which cooperates with the adjacent end surface of the valve stem 27 for reasons which will be described hereinafter.

The right end portion at 24a of the rod assembly 24 has a smaller diameter than the portion to the left thereof which is in sliding engagement with the valve stem 27. The reduced diameter portion 24a therefore forms an annular flow passage 34 with the stem 27 which extends between one or more spaced orifices 35 in the stem 27 and the compressor reservoir 3. When the bleeder valve is open, as will be shown, limited communication between the bore 16 and the reservoir 3 is provided through the passage 34 and the orifices 35.

A compressor spring 36 is positioned in the bore 21 between the seat of said bore 21 and the piston 22. The spring 36 urges the piston 22 leftwardly to a position in which the bleeder valve 32 by its sealing ring 33 engages the valve head portion 29, and the valve head 29 by its sealing ring 30 engages the housing 12a at 31. This is the closed position of the valve assembly 12 which is its normal position during the "On" cycle, and furthermore, this is the position of the valve in which lubricant from the compressor reservoir 3 is circulated as described above but is not able to enter or leave the compressor reservoir 3.

The valve assembly 12 is also provided with a filter disc 37 which is mounted in the open end of the bore 21 to keep out dirt and dust.

A conduit 38 is provided on the present device to control the opening and closing of the valves. One end of the conduit 38 is connected to a control port 38a which in turn connects with an expansible chamber 21a formed between the piston 22 and the seat of the bore 21, and the other end of said conduit connects with the intake or control valve portion (not shown), of the compressor 2.

It is important to consider the operation of the compressor control valve and the effect that it has on the compressor and the lubricating valve. Two conditions will occur; first, the "On" cycle when the compressor is discharging compressed air to the oil sump and air reservoir; and secondly, the "Off" cycle when the supply of air to the compressor is interrupted which obviates the discharge of compressed air into the oil sump and air reservoir. The operation of the compressor shifts or cycles between the above two conditions in response to changes in the pressure in the air reservoir. If the pressure in the air reservoir reaches a predetermined maximum level, the control valve is actuated to interrupt the supply of air to the compressor whereby said compressor reverts to the "Off" cycle and creates a partial vacuum in the intake portion thereof. The intake portion of the compressor is connected to the expansible chamber 21a in the lubricating valve 12, as previously described. Conversely, if the pressure in the air reservoir diminishes to a predetermined minimum pressure, the control valve is actuated to again supply air to the compressor destroying the above mentioned partial vacuum and reverting to the "On" cycle.

With the connection between the expansible chamber 21a and the compressor control valve as described, when the compressor unloads and goes into its "Off" or idle cycle, and a partial vacuum is created in the intake or suction side thereof (not shown), the partial vacuum creates a partial vacuum on the right side of the piston 22 in the bore 21 and thereby establishes a pressure differential across the piston 22. When the pressure differential is great enough to overcome the opposing force of the compressed air in the reservoir 3 acting on the relatively small area of the bleeder valve 32, it will cause the piston 22 to move rightwardly. This initial movement opens the bleeder valve 32 and bleeds off a portion of the pressure in the reservoir 3. As the piston continues to move rightwardly the O ring 26 carried thereby engages the left end of the valve stem 27. In this position, and with the pressure in the reservoir reduced by the action of the bleeder valve, only the relatively small remaining pressure acting on the valve head 29 plus the force of the compression spring 36 opposes additional rightward movement of the piston 22 produced by the pressure differential thereacross. When the reservoir pressure has been reduced by a predetermined amount the piston 22 overcomes the combined force on the valve head 29 and the spring 36 and unseats the valve head 29. This completes the unloading of the pressure in the reservoir 3 and establishes flow communication between the counterbore 16 and the reservoir 3.

With the valve assembly 12 in the open position as just described, the lubricant which is continuously being circulated by the pump 13 is now directed also into the reservoir 3 to replenish the supply therein. If the lubricant level in the reservoir 3 is greater than required, by being at a higher level than the counterbore 16, the compressed air unloaded by the valves 29 and 32 during opening thereof will actually force the excess lubricant through the valve and back into the circulating oil system, otherwise lubricant flows to the reservoir 3.

When the compressor reverts to the "On" cycle, the partial vacuum at the inlet is destroyed and the conduit 38 is vented to atmosphere by means on the compressor (not shown). At this time the spring 36 restores the piston 22 to its leftward position closing the valves 29 and 32 and the compressor resumes discharging compressed air to the storage tank 8.

Figure 2:
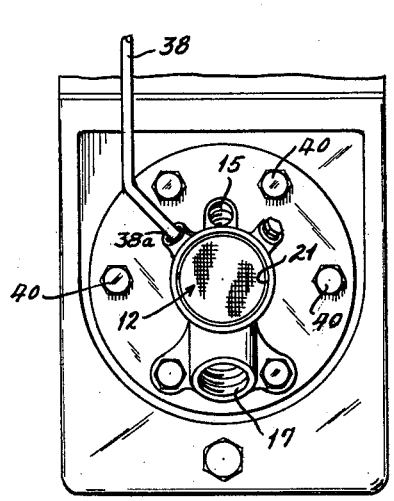
FIG. 2 is a view of the compressor and lubricating device taken on line 2—2 in FIG. 1.

FIG. 2 shows an end view of the valve assembly 12 with bolts 40 provided for fastening it to the compressor.

Figure 3:
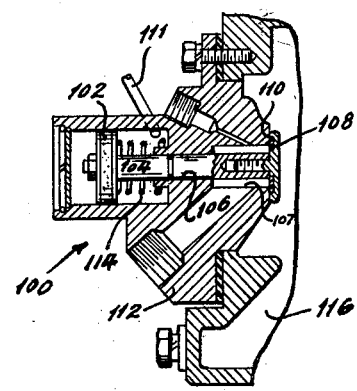
FIG. 3 is a fragmentary cross-sectional view showing a modified form of the lubricating means of FIGS. 1 and 2.

FIG. 3 shows a modified form 100 of the valve assembly. One difference between the modified assembly 100 and the assembly 12 is that the modified assembly 100 has only one valve between the circulating oil system and the compressor reservoir while the valve 12 has two, namely the valves 29 and 32. The modified valve has a piston 102 attached to a rod assembly 104 which is slidably positioned in a housing bore 106, and the right end of the rod assembly 104 carries a valve head 108 which cooperates with a wall 110 adjacent the end of a counterbore or sump port 107. A spring 114 urges the piston 102 into a leftward position closing the valve 108 on the wall 110. When a predetermined pressure differential is across the piston 102 as provided by conduit 111 which is connected to the compressor control means (not shown), the piston 102 moves to the right thereby opening the valve 108 and permitting lubricant being circulated through the valve to also pass into or out of the compressor reservoir 116 depending on the level of lubricant therein.

Furthermore by using the valve assembly of FIG. 3, when the compressor goes into its "Off" cycle its control valve functions not only to create the partial vacuum in the expandable chamber on the right side of the piston 102, but it usually also includes other means associated therewith (not shown) which partially dissipate the pressure in the oil sump 116. This partial dissipation of pressure in the oil sump is usually necessary when using the modified valve assembly 100 to enable the pressure differential across the piston 102 to be able to move the valve to an open position against the sump pressure acting on the effective area of the valve 108 and the force of the spring 114. Therefore, the additional means required for the compressor control valve to partially dissipate the sump pressure when using the modified construction shown in FIG. 3 is a further difference between the modified construction of FIG. 3 and the construction shown in FIG. 1.

Thus it is apparent that there has been shown and described novel lubricating means for compressors and the like which fulfill all of the objects and advantages sought therefor. Briefly, the lubricating means comprises a housing mounted on a compressor or the like adjacent to the compressor reservoir, said lubricating means having a flow passage therethrough, means for circulating lubricant through the flow passage, and valve means positioned between the flow passage and the compressor, said lubricating means also including means responsive to a condition in the compressor for opening the valve means to provide an interchange of lubricant between the circulating lubricant flow passage and the compressor to maintain a predetermined lubricant level in the compressor. The present lubricating means also includes bleeder valve means in association with the valve means to provide initial partial dissipation of the pressure in the compressor during operation of said lubricating means.

Numerous changes, alterations and modifications of the present device will become apparent to those skilled in the art after considering this specification in conjunction with the accompanying drawing. All such changes, alterations and modifications which do not depart from the spirit and scope of the invention are deemed covered by the invention which is limited only by the claims which follow.

What is claimed is:

1. Means for maintaining a preselected lubricant level in a compressor oil reservoir comprising a housing having a chamber therein, an inlet and an outlet to said chamber, means for moving oil from said inlet through said chamber to said outlet, and valve means positioned between said chamber and the compressor reservoir at substantially the preselected oil level, said valve means comprising a valve seat, a movable valve member for engagement with said seat, yieldable means normally urging said valve member into engagement with said valve seat to close flow communication between said movable valve member and reservoir, passage means in said movable valve member connecting said reservoir with said chamber, bleeder valve means slidable in said valve member normally closing said passage means, said bleeder valve means being adapted upon opening to provide relatively limited flow communication between the valve chamber and reservoir, a cylinder in said housing, piston means slidably mounted in said cylinder and connected to said bleeder valve means, means connecting said cylinder to a variable pressure source, said piston means being initially movable in response to predetermined pressure changes of said source to move said bleeder valve means to an open position and subsequently movable to abut with said valve member and disengage said valve member from said valve seat to establish substantially unlimited flow communication between said chamber and reservoir.

2. A lubrication valve for a compressor comprising a housing having inlet, outlet, sump and control ports therein, said inlet and outlet port being in open communication, valve means controlling communication between said sump port and said inlet and outlet ports, and valve control means responsive to predetermined maximum and minimum pressures at said control port for moving said valve means to establish closed and open communication between said sump port and said inlet and outlet ports, respectively.

3. A lubrication valve for a compressor comprising a housing having inlet, outlet, sump and control ports therein, said inlet and outlet ports being in open communication, valve means normally closing communication between said sump port and said inlet and outlet ports, and valve control means movable in response to a predetermined pressure at said control port to move said valve means to a position establishing open communication between said sump port and said inlet and outlet ports.

4. A lubrication valve for a compressor comprising a housing having inlet, outlet, sump, control, and atmospheric ports therein, said inlet and outlet ports being normally in open communication, valve means controlling communication between said sump port and said inlet and outlet ports, and valve control means movable in response to a predetermined pressure differential between said control and atmospheric ports to move said valve means to a position establishing open communication between said sump port and said inlet and outlet ports, and resilient means in biasing engagement with said valve control means to move said valve means to a position closing communication between said sump port and said inlet and outlet ports when the pressure differential between said control and atmospheric ports is substantially equalized.

5. A lubrication valve for a compressor comprising a housing having inlet, outlet, sump and control ports therein, said inlet and outlet ports being in open communication, first valve means controlling communication between said sump port and said inlet and outlet ports, relief passage means in said first valve means between said sump port and said inlet and outlet ports, second valve means controlling limited communication through said relief passage between said sump port and said inlet and outlet ports, and valve control means movable in response to predetermined minimum and maximum pressures at said control port to initially move said second valve means to establish open and closed limited communication between said sump port and inlet and outlet ports through said relief passage means, respectively, and to subsequently move said first valve means to establish substantially unlimited open and closed communication between said sump port and said inlet and outlet ports, respectively.

6. A lubrication valve for a compressor comprising a housing having inlet, outlet, sump and control ports therein, said inlet and outlet ports being in open communcation, valve means normally closing communication between said sump port and said inlet and outlet ports, pressure relief passage means in said valve means between said sump port and said inlet and outlet ports, other valve means normally closing communication through said pressure relief passage means, and valve operating means initially movable in response to a predetermined pressure at said control port to move said other valve means and establish limited communication between said sump port and said inlet and outlet ports through said pressure relief passage means and further movable to move said valve means and establish open communication between said sump and said inlet and outlet ports.

7. A lubrication valve for a compressor comprising a housing having inlet and outlet ports in open communication, a sump port adapted for communication with said inlet and outlet ports, a control chamber having one end thereof open to atmosphere, first valve means normally closing communication between said sump port and inlet and outlet ports and having an end portion in said chamber, second valve means concentric with said first valve means and having an end portion in said chamber, passage means between said first and second valve means connecting said sump port with said inlet and outlet ports, said second valve means normally closing communication through said passage means, a control port in said chamber, and piston means slidable in said chamber between said one end thereof and said control port and connected with the end portion of said second valve means, said piston means being movable in response to a predetermined pressure differential between said one chamber end and control port to move said second valve means and establish limited communication between said sump port and said inlet and outlet ports through said passage means and further movable into abutment with the end portion of said first valve means to move said first valve means and establish open communication between said sump port and said inlet and outlet ports.

8. A lubricating valve for maintaining a predetermined level of lubricant in a reservoir comprising a housing, a lubricant chamber in said housing and connected with said reservoir at substantially the desired predetermined lubricant level therein, means for circulating lubricant through said lubricant chamber, valve means normally closing communication between said lubricant chamber and reservoir to prevent free interchange of lubricant therebetween, a control chamber in said housing, and valve actuating means slidable in said control chamber and connected with said valve means, said valve actuating means being movable in response to a predetermined pressure in said control chamber to move said valve means to a position opening communication between said lubricant chamber and reservoir to provide free interchange of lubricant therebetween.

9. A lubricating system comprising a compressor having a pressure portion, a lubricant sump portion and a lubricant supply portion, a chamber in said supply portion connecting with said compressor sump portion at approximately the desired predetermined lubricant level for said compressor sump portion, a source of lubricant, an inlet into said chamber connected to said source, an outlet from said chamber connected to said source, means circulating lubricant from said source through said inlet, said chamber, said outlet and back to said source, valve means normally interrupting communication between said chamber and compressor sump portion, valve actuating means connected with said valve means, and means connecting said valve actuating means in pressure fluid communication with said compressor pressure portion, said valve actuating means being movable in response to predetermined pressure changes in said compressor compression portion to move said valve means to a position establishing open communication between said chamber and compressor sump portion.

10. A lubrication system comprising a source of lubricant, a compressor including a lubricant sump portion and a lubricant supply portion, means for continuously flowing lubricant from said source to said compressor supply portion and back to said source, valve means controlling lubricant flow communication between said compressor sump portion and supply portion, valve operating means connected with said valve means, control means for said compressor and valve operating means and periodically subjecting said valve operating means to atmospheric pressure and a pressure less than atmospheric, said valve operating means being movable in response to pressure less than atmospheric to move said valve means to a position establishing lubricant flow communication between said compressor sump portion and supply portion, and resilient means for biasing said valve operating means to move said valve means to a position interrupting lubricant flow communication between said compressor sump portion and supply portion when said valve operating means is subjected to atmospheric pressure.

11. A lubricating system comprising a compressor having a lubricant sump portion and a lubricant supply portion, a source of lubricant, delivery and return branches for continuously circulating lubricant between said source and compressor supply portion, valve means controlling lubricant flow communication between said compressor supply portion and sump portion, valve operating means connected with said valve means, control means for said compressor and valve operating means, said control means periodically subjecting said valve operating means to first and second predetermined pressures, said valve operating means being movable in response to the first predetermined pressure to move said valve means to a position establishing open lubricant flow communication between said compressor supply portion and sump portion, and resilient means for biasing said valve operating means and valve means to a position closing lubricant flow communication between said compressor supply portion and sump portion when said valve operating means is subjected to the second predetermined pressure.

References Cited in the file of this patent
UNITED STATES PATENTS

| | | |
|---|---|---|
| 1,566,814 | Bliss | Dec. 22, 1925 |
| 2,159,815 | McCune | May 23, 1936 |
| 2,285,426 | Freeman | June 9, 1942 |
| 2,737,933 | Swenson | Mar. 13, 1956 |